(12) United States Patent
Sharpe et al.

(10) Patent No.: US 8,270,592 B2
(45) Date of Patent: Sep. 18, 2012

(54) CALL ROUTING MANAGEMENT BASED ON CALLER LANGUAGE

(75) Inventors: Bruce Sharpe, Aurora, CO (US); Tom MacDonald, Parker, CO (US)

(73) Assignee: TeleTech Holdings, Inc., Englewood, CO (US)

( * ) Notice: Subject to any disclaimer, the term of this patent is extended or adjusted under 35 U.S.C. 154(b) by 1929 days.

(21) Appl. No.: 11/317,420

(22) Filed: Dec. 22, 2005

(65) Prior Publication Data
US 2007/0147599 A1    Jun. 28, 2007

(51) Int. Cl.
H04M 3/00        (2006.01)
H04M 5/00        (2006.01)

(52) U.S. Cl. ......... 379/265.05; 379/265.01; 379/265.09; 379/265.12; 379/266.01

(58) Field of Classification Search ............. 379/266.01, 379/265.02, 127.01, 265.13, 88.19, 265.01, 379/265.12, 265.09, 265.11, 88.01, 88.06, 379/88.21, 265.05, 88.2; 704/231
See application file for complete search history.

(56) References Cited

U.S. PATENT DOCUMENTS

| | | | | |
|---|---|---|---|---|
| 6,038,293 | A * | 3/2000 | McNerney et al. ........ | 379/88.19 |
| 6,661,882 | B1 * | 12/2003 | Muir et al. ............... | 379/127.01 |
| 6,700,972 | B1 * | 3/2004 | McHugh et al. ......... | 379/265.13 |
| 6,845,154 | B1 * | 1/2005 | Cave et al. ............... | 379/265.02 |
| 6,934,379 | B2 * | 8/2005 | Falcon et al. ............ | 379/265.02 |
| 7,088,814 | B1 | 8/2006 | Shaffer et al. | |
| 7,349,843 | B1 * | 3/2008 | Beck ............................ | 704/231 |
| 2003/0115353 | A1 | 6/2003 | Deryugin et al. | |
| 2004/0111310 | A1 | 6/2004 | Szlam et al. | |
| 2004/0240635 | A1 * | 12/2004 | Bushey et al. ............. | 379/88.16 |
| 2009/0110178 | A1 | 4/2009 | Timmins et al. | |

OTHER PUBLICATIONS

U.S. Appl. No. 11/562,210, filed Nov. 21, 2006, Non-Final Office Action dated Aug. 19, 2010, 12 pages.

* cited by examiner

*Primary Examiner* — Thjuan K Addy
(74) *Attorney, Agent, or Firm* — Stanley J. Gradisar Attorney At Law LLC; Stanley J. Gradisar (57) ABSTRACT

An approach for over the phone interpretation call management is provided herein. Calls from customers of a client are received at an interactive voice recognition (IVR) system, which determines a language of the caller by detecting the language or language selection by keypad entry. The IVR system forwards the call along with a modified ANI number to a Call Management Center (CMC), which determines an appropriate agent to handle the call based on the client information and the modified ANI number. The call is then forwarded to the agent and a screen corresponding to the call is activated in a call service application for the agent. Additional applications such as quality monitoring are concurrently executed with the call processing.

20 Claims, 6 Drawing Sheets

CALL ROUTING MANAGEMENT BASED ON CALLER LANGUAGE

BACKGROUND

Many call centers handle a large volume of inquiries, usually by phone, for sales, information, customer support and other services. Typical call centers provide the ability to route multiple incoming, customer-initiated calls to agents which provide sales, information, or support on behalf of an entity interested in establishing or maintaining a relationship with the customer. An Automatic Call Distributor (ACD) is utilized to selectively route the incoming calls. An ACD generally refers to a device that receives incoming voice calls, answers with a taped announcement, holds the calls with background music or a message, then automatically assigns the call on a first come first serve basis to the next available agent.

Modern call center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

Furthermore, many call centers provide services to multiple countries, if not worldwide. This may result in a need for call centers to be able to provide their services in multiple languages with consistency. Even in the US, it has become common practice for call centers to provide assistance in at least three or four languages (e.g. Spanish, Chinese, Korean) in addition to English. Establishing separate call centers for each language or directing calls from a single center to different language-based centers may prove challenging for entities that provide services such as sales, support, and the like.

It is with respect to these and other considerations that the present invention has been made.

SUMMARY

Embodiments are generally related to over the phone interpretation call management. More particularly, the embodiments involve detecting a language preferred by a customer at a call center that manages calls on behalf of a plurality of clients. The detected language selection may be forwarded to a call management center employing a call destination identifier such as a Dialed Number Identification Service (DNIS) number. Information associated with an identity of the client, a project assigned to the client, a subdivision of the client, and the like, may be overloaded to a call origination identifier such as an Automated Number Identification (ANI) number and forwarded to the call management center.

The call management center may assign an agent to service the call based on the language selection, client identity, client project, schedule of available services, and the like. Individual components of the system may communicate with each other and the customer over a variety of communication networks.

According to some embodiments services such as quality assurance monitoring, statistical and/or financial data gathering, and the like, may be provided in addition to distributing the calls to local or remote agents.

Various embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Embodiments will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In modern electronic telecommunications, incoming calls are no longer necessarily phone communications but can also encompass a broad range of new communication channels such as electronic mail, interactive chat, instant messaging, video conferencing, voice messaging, and the like. The term "call" is used throughout this text to designate the entire range of communication formats which a call center is capable of handling.

The term "client" refers to entities interested in establishing or maintaining a relationship with the customer, on whose behalf the call center processes incoming calls.

The term "agent" refers to call center personnel or a computerized application, in some cases, that respond to customer calls. "Agents" may be locally situated at the call center or remotely situated. Remotely situated agents may be referred to as "home agents" or "remote agents".

Figure 1:
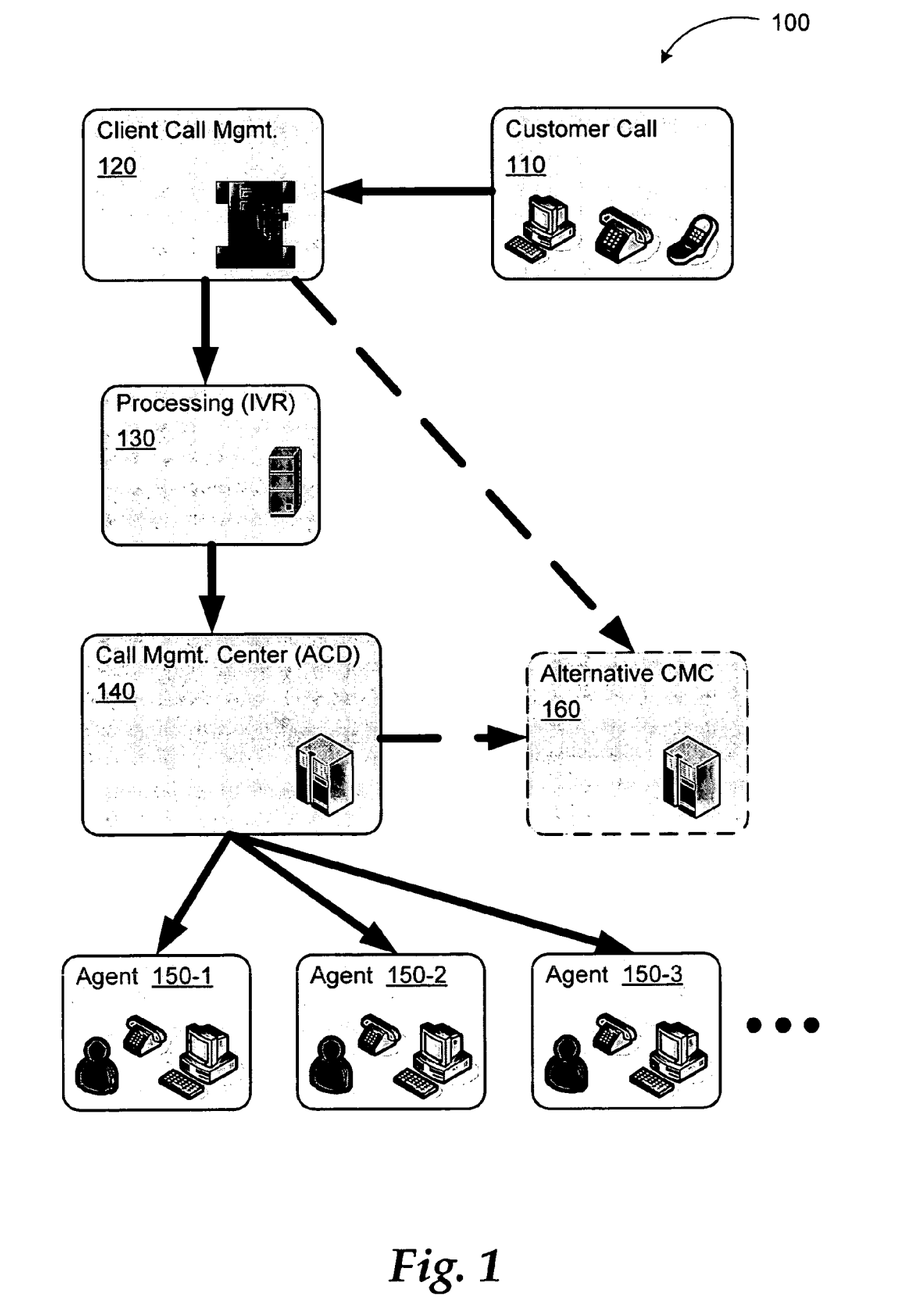
FIG. 1 is a conceptual diagram illustrating major blocks of an over the phone interpretation call management system in accordance with an embodiment.

In general, the embodiments relate to processing calls at a call center providing multiple language service. Referring to FIG. 1, major functional blocks of an example over the phone interpretation (OPI) call management system (100) are shown in a conceptual diagram.

OPI call management system 100 includes customer call 110, client call management block 120, processing block 130, call management center (CMC) 140, alternative CMC 160, and agents 150-1 through 150-3. Agents 150-1 through 150-3 may include any number of agents servicing calls from customers for sales, customer support, and the like. Each of the major functional blocks may perform a variety of actions associated with managing customer calls. The actions may be performed by one or more computing devices individually, or in a distributed manner where the computing devices communicate over one or more networks. Other devices such as telephones, telephone network devices, and the like may also be part of the OPI call management system. All these devices are well known in the art and need not be discussed at length here.

Computing device(s) performing the actions may contain communications connection(s) for communicating with each other and other devices. The communications connection(s) is/are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

The computing devices typically include at least some form of computer readable media. Computer readable media can be any available media that can be accessed by a processing unit. By way of example, and not limitation, computer readable media may comprise computer storage media and communication media. Combinations of any of the above should also be included within the scope of computer readable media.

As mentioned above, the computing devices may operate in a networked environment using logical connections to one or more remote computers (not shown). The remote computer may be a personal computer, a server computer system, a router, a network PC, a peer device or other common network node, and typically includes many or all of the elements relative to the computer devices. The logical connections between the computer devices may include a local area network (LAN) or a wide area network (WAN), but may also include other networks. Such networking environments are commonplace in offices, enterprise-wide computer networks, intranets, and the Internet.

By way of example, and not limitation, a remote application program may reside on memory device connected to the remote computer system. It will be appreciated that the network connections explained are exemplary and other means of establishing a communications link between the computers may be used.

With the above described computing environment in mind, logical operations of the various exemplary embodiments described below in connection with an OPI call management process may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

OPI call management system 100 is based on a typical structure of a call center handling calls from customers of multiple clients. For example, a call center may handle customer service calls for a number of retail sales companies, sales calls for catalog sales companies, and patient follow-up calls for health care providers. In such a structure, the call center may receive calls directly from the customers or through client call management systems. Customer call 110 may be placed through client call management block 120 or directly (not shown) to processing block 130 employing methods including a phone call over a PSTN line, a cellular call, an Unlicensed Mobile Access (UMA) network call, an Internet telephony call, computer communications (e.g. electronic mail, instant messaging), and the like. Other methods of communication may also be used implementing the principles described herein.

As a first step in call management, information associated with the customer call may be resolved from the network by client call management block 120 or by processing block 130. Caller information resolved from the voice or data network may include the caller's telephone number or their IP address, whether they are calling from a business or residential line, geographic location, and the like. Further information associated with the caller such as past caller history, caller demographics, and the like may also be retrieved from a database based on the initial caller information. A basic form of caller information is Automatic Number Identification (ANI) number. In typical PSTN systems, the ANI number is the caller's phone number provided to the call destination during the rings before the call is accepted. Other forms of call origination identifiers include IP addresses, International Mobile Subscriber Identity (IMSI) numbers, and the like.

In some embodiments, client call management block 120 may identify a nature of the customer call, a language to be used in handling the call and contact processing block 130 making a language selection. In other embodiments, client call management block 120 may simply forward the call to processing block 130.

Processing block 130 may receive the call along with a language selection (e.g. DTMF keypad entry) or without a language selection. In the latter case, processing block 130 may determine the caller's language employing Interactive Voice Recognition (IVR). Processing block 130 may then modify the ANI number to include information associated with client identification, client project identification, and the like. Processing block 130 subsequently forwards the call to Call Management Center (CMC) 140 for distribution to an agent. In forwarding the call to CMC 140, processing block 130 typically uses one of a block of destination addresses (e.g. an 800 number among a block of 800 numbers). If client call management block 120 determines that the caller's language is not among the languages provided by CMC 140, it may forward the call to alternative CMC 160.

CMC 140 receives along with the call, information such as selected language, client identification, customer identification, and the like. Parts of that information may be provided in the modified ANI number. Another portion of the information may be provided by the destination address used by processing block 130. For example, Dialed Number Identification Service (DNIS) is a telephone service that identifies for the receiver what telephone number was dialed by the caller. A common use for this type of system is 800 and 900 phone numbers that often channel multiple phone numbers into the same PBX system. Once the call enters the PBX system, the DNIS identifies which number was dialed and records that information. Accordingly, the DNIS number may provide CMC 140 the language selection information.

CMC 140 determines which agent the call should be assigned to based on the language selection, a service schedule, a client and/or project identification, and the like. The call is then connected to the assigned agent (e.g. agents 150-1, 150-2, 150-3, . . . ).

The agent may communicate with the customer through a telephone line or using another method such as e-mail or Internet chat. The agent may consult with a computer application during the call and record the transactions through the same or another application on a computer terminal or a personal computer networked with the call center's recording system. Communication between the agent and CMC 140 may be through networks such local area networks (LANs), wide area networks (WANs), the Internet, private wireless or wired networks, or combinations of these networks. Agents may be located physically at the call center or at numerous locations throughout the globe. It is not uncommon for a U.S. call center to route customer calls to agents in other countries such as India, Mexico, Argentina, and the like.

CMC 140 may perform many other tasks in addition to routing customer calls to agents. For example, the number of calls handled by each agent for the call center may be tracked and provided to payroll services. Statistical records of each customer-initiated call may be maintained and provided to the client. Moreover, agents' interactions with the customers may be monitored for quality assurance purposes on behalf of the client. CMC 140 may also forward the call to alternative CMC 160, if the language is not provided by its agents, if service capacity is reached, and similar reasons.

Figure 2:
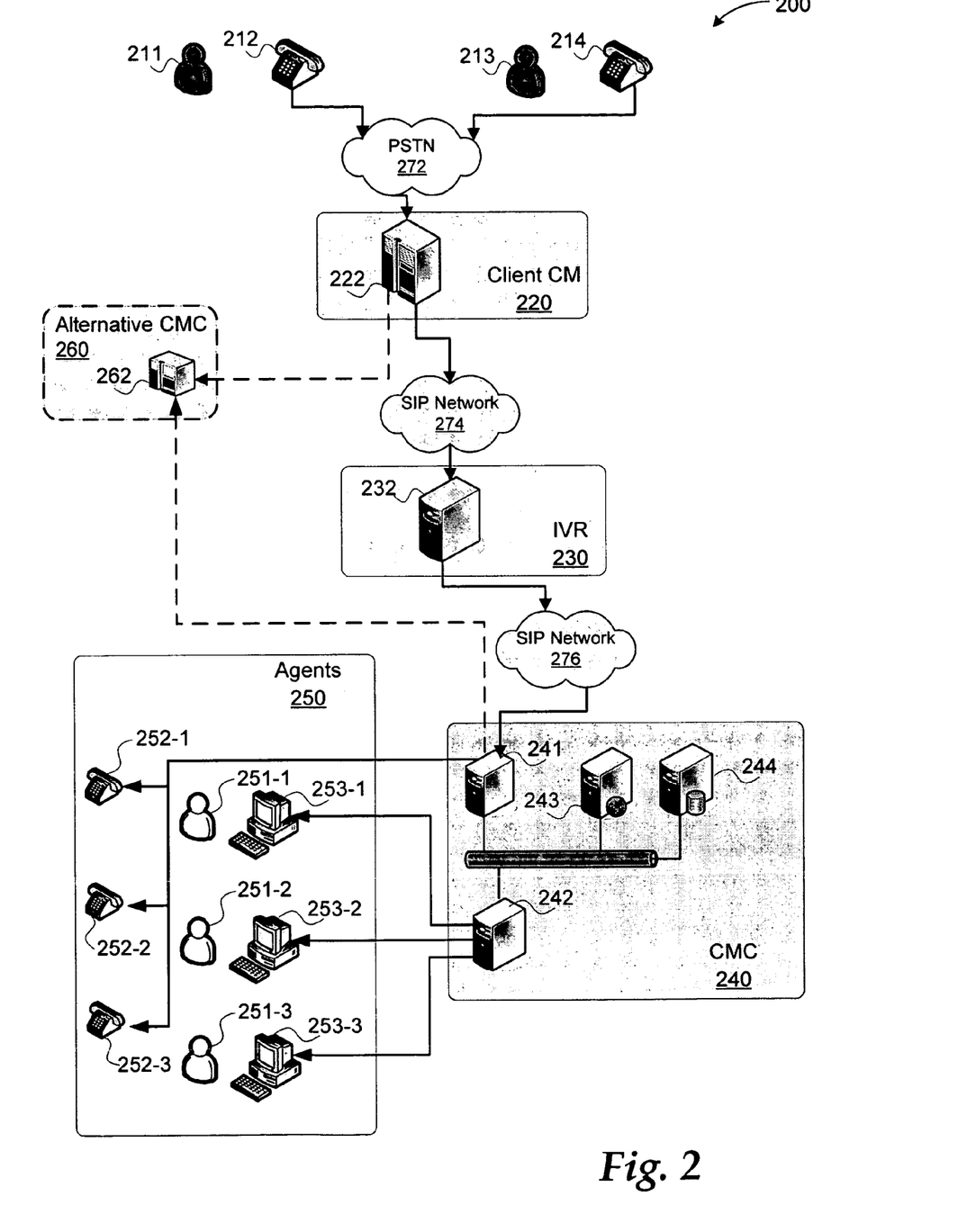
FIG. 2 shows an example embodiment of an over the phone interpretation call management system and interactions of its components.
Figure 3:
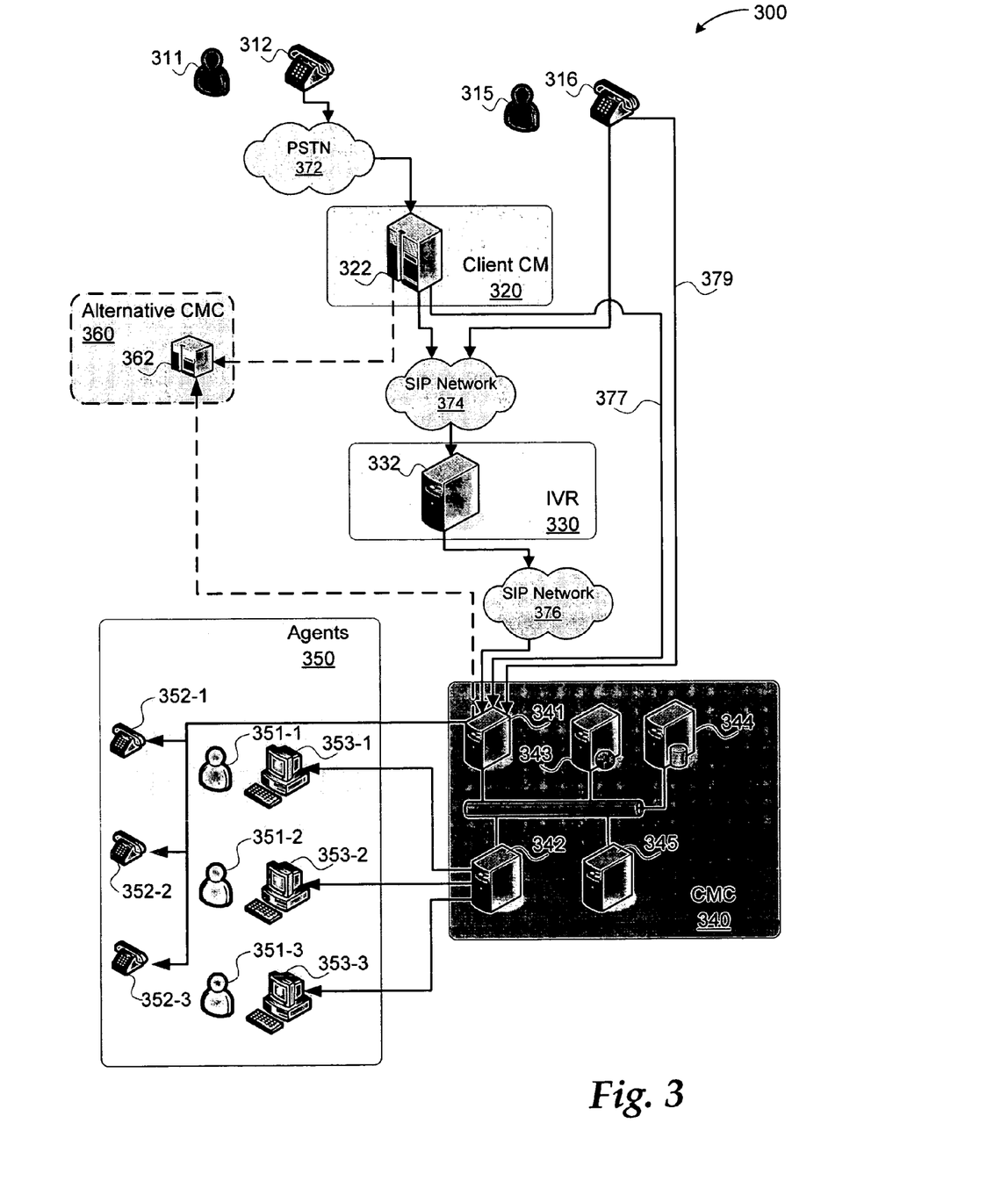
FIG. 3 shows another example embodiment of an over the phone interpretation call management system and interactions of its components.

As mentioned previously, many types of communications may be utilized between the customer and the call center. FIGS. 2 and 3 show variations of an OPI call management system receiving customer calls over a PSTN line and using digital SIP networks for communications between the system components.

Referring now to FIG. 2, an example embodiment of an over the phone interpretation (OPI) call management system and interactions of its components are shown. OPI call management system 200 includes customers 211 and 213 placing calls to a call center using phones 212 and 214 over PSTN 272. Client call management system 220 received the customer calls and communicates with Interactive Voice Recognition (IVR) subsystem 230 of a call center over SIP network 274. Client call management system 220 may also forward customer calls to optional alternative call management center 260 in case the call center is incapable handling the call(s) for reasons like language of the caller not being in the call center list, the call center reaching its capacity, call arriving outside a service schedule of the call center, and the like. Calls may be forwarded to the optional alternative call management center 260 by Automated Call Distribution (ACD) server 241 of Call Management Center (CMC) 240 as well, for similar reasons.

Client call management system 220 may comprise one or more servers 222 or other telecommunication equipment known in the art such as switches, converters, and the like. Alternative call management center 260 may include one or more servers (e.g. server 262) to process incoming calls and route them to available agents in a similar manner to call management center 240.

IVR subsystem 230 may also include one or more servers and other computing devices configured to detect a language of the calling customer and provide feedback in form of voice prompts. IVR server 232 of the IVR subsystem 230 may also detect the preferred language of the customer based on DTMF keypad entries (customer selection). In yet another embodiment, client call management system 220 may provide language selection information to IVR server 232. In addition to detecting the language of the customer, IVR server 232 (or an IVR application thereon) may also detect an accent of the customer such as a difference between Spanish from Mexico and Spanish from Spain. Such an accent detection feature may be utilized in directing calls to agents for different geographic areas. IVR server 232 may further detect a call origination identifier such as an ANI number. The ANI number may be used, in some embodiments, to retrieve customer or client specific information such as geographic information, demographic information, call history, and the like. The ANI number may also be used to determine a client identity and a project or a subdivision associated with the client.

Upon detecting the preferred language and/or accent and retrieving the information associated with the customer and/or client, IVR server 232 may overload the ANI number such that the prefix of the number identifies the client and the last four digits identify the project or subdivision associated with the client. By overloading the ANI number in this manner, IVR server 232 may use any carrier's telecommunication network without having to create special data packets for the forwarded information.

IVR server 232 then forwards the call to a language specific number at CMC 240. The language specific number (DNIS) identifies the selected language to ACD server 241 of CMC 240. ACD server 241 may assign an agent among agents 250 (e.g. agent 251-1, 251-2, 251-3, and so on) to the call and facilitate connection between the agent's communication equipment (e.g. phone 252-1 through 252-3) and the customer's phone.

While establishing the connection between the customer and the assigned agent, ACD server 241 may provide the client and customer specific information to an applications server 242 such that an application is executed providing the assigned agent a user interface with customer and client specific information. For example, a customer calling the technical support hotline of a retail company and speaking Chinese may be routed to a Chinese speaking agent by the ADC server 241, while applications server 242 brings up a screen on the assigned agent's terminal with information about the customer, the customer's service history, location, purchase history, and the like.

CMC 240 may include additional servers performing other duties. For example, global workflow server 243 may receive data from ACD server 241 about assigned agents, number and duration of calls, frequency of calls for particular client projects or subdivisions, and the like. Global workflow server 243 may then utilize the data in analyzing, reporting, and managing workflow for particular clients or the call center in general.

In another embodiment, database server 244 may be used to store statistical and other data associated with distributed calls for purposes such as client billing, agent compensation, scheduling, and the like. Servers 241-244 of CMC 240 may communicate over a network such as the Ethernet network shown in the figure. Other networks providing communication between the servers of CMC 240 may include any type of network such as dedicated networks, secure/unsecure networks, and the Internet.

In a further embodiment, ACD server 241 may assign agents based on a schedule of available services. For example, agent services for different languages may be provided at different times of day, different days of week, and the like. The availability of services may also be based on geographic location, client project, and the like. ACD server 241 may maintain or receive from another server a matrix of available services schedule and assign agents based on the availability of services.

Each of the above listed sub-systems may perform actions explained in FIG. 2 individually or in a shared manner. Some or all of the sub-systems may be combined or split into smaller sub-systems. At least a portion of the actions associated with the OPI call management may be performed by software applications in each sub-system, while another portion of the actions may be performed by hardware applications. The present invention is not limited to the example software and hardware applications described herein. Furthermore, the network types such as PSTN 272 and SIP network 274 are for example purposes only and do not constitute a limitation on embodiments. Other network types such as wired or wireless networks for Internet telephony, cellular networks, Unlicensed Mobile Access (UMA) networks, and the like may be implemented without departing from a scope and spirit of the invention.

The computing devices described herein are only examples of a suitable operating environment and are not intended to suggest any limitation as to the scope of use or functionality of the embodiments. Other well known computing systems, environments, and/or configurations that may be suitable for use with the embodiments include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 3 illustrates another example embodiment of an OPI call management system and interactions of its components. Components of OPI call management system 300 that are likewise numbered in OPI call management system 200 of FIG. 2 are arranged to operate in a similar manner.

OPI system 300 includes client call management system 320 with its call management server 322 receiving calls from customer 311 using his/her phone 312 over PSTN 372. Client call management system 320 forwards calls to IVR server 332 of IVR subsystem 330 over SIP network 374 or through another network to optional alternative CMC 360. IVR server 332 detects language of the caller, overloads an ANI number with client information and forwards the call to a language specific number (DNIS) at ACD server 341 of CMC 340.

CMC 340 includes, in addition to ACD server 341, applications server 342, global workflow server 343, and database server 344. ACD server 341 can assign calls to anyone of agents 251-1 through 251-3 using their communication equipment 352-1 through 352-3, respectively. Applications server 342 provides customer and/or client specific information to the terminals or computers (e.g. 253-1 through 253-3) of assigned agents.

Differently from OPI call management system 200 of FIG. 2, in OPI call management system 300, customer 315 may place a call directly to ACD server 341 of CMC 340. In addition, client call management system 320 may also forward a customer call directly to ACD server 341. In both cases, the language selection is made by DTMF entry or similar method not involving language detection by voice recognition because ACD server 341 lacks IVR capability. Furthermore, customer 315 may be enabled to dial into IVR subsystem 330 directly using his/her communication equipment 316. This may require in some cases an Internet telephony or a UMA call, especially if the IVR server 332 is connected to a data packet based network.

Moreover, CMC 340 may include Computer Telephony Integration (CTI) server 345 arranged to facilitate integrated operation of applications server 342 and ACD server 341. Similar to FIG. 2, servers of CMC 340 may interact with each other over any type of network such as the Ethernet connection shown in the figure.

Figure 4:
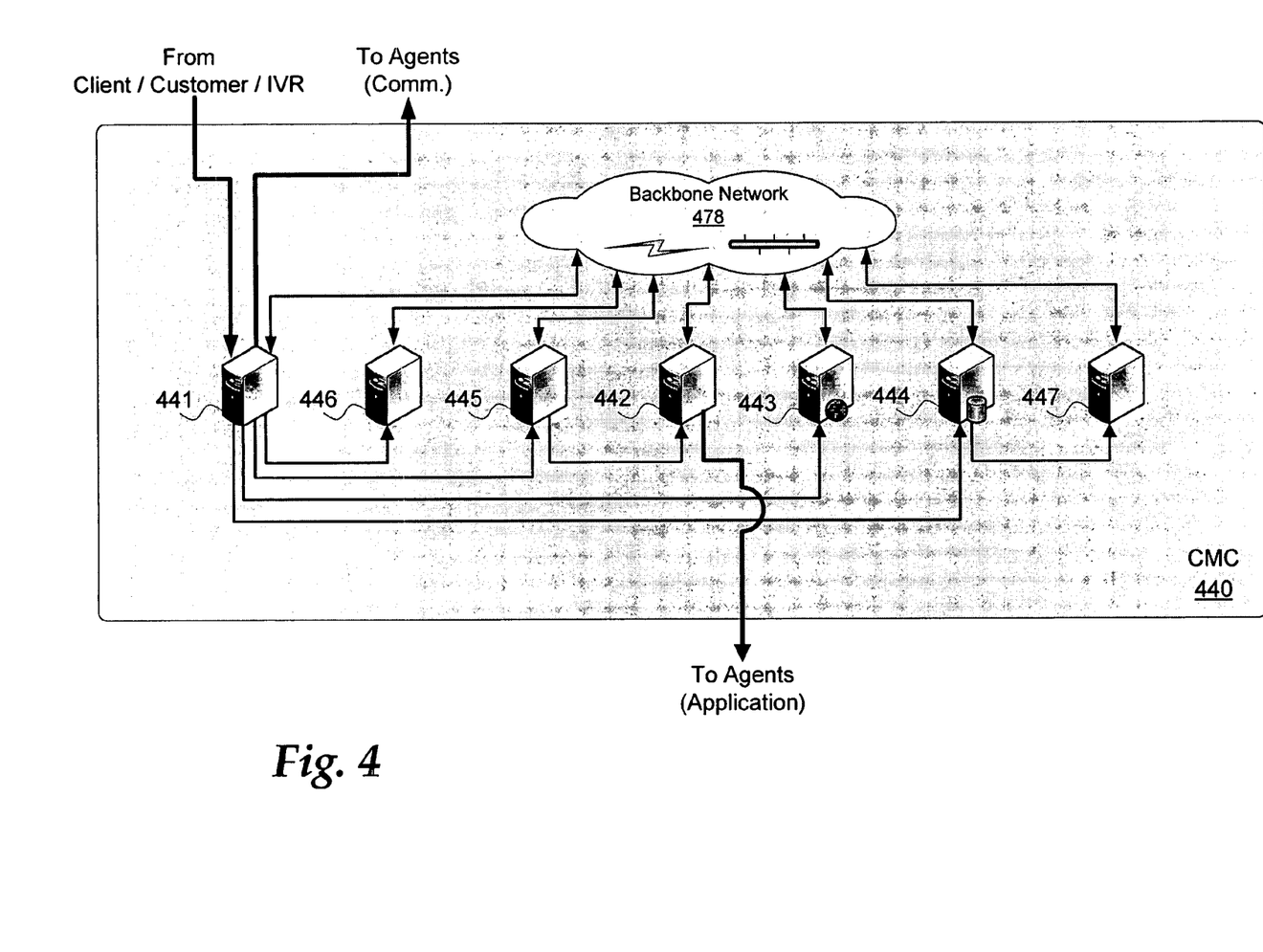
FIG. 4 illustrates an example call management center of an over the phone interpretation call management system and interactions of its components.

Referring now to FIG. 4, an example call management center of an OPI call management system and interactions of its components are illustrated. CMC 440 includes ACD server 441, applications server 442, global workflow server 443, database server 444, CTI server 445, quality monitoring server 446, and custom application server 447. The servers may interact with each other over backbone network 478, which may include a LAN, a WAN, the Internet, wired or wireless network(s), and any combinations of those.

ACD server 441 is arranged to receive calls from one of: the client, the customer, and the IVR server of a processing system as described previously. The calls may include an overloaded call origination identifier that can be used to determine client specific information such as client identity, a client project and/or subdivision. Furthermore, ACD server 441 may also receive information associated with the customer such as identity, geographic location, call history, and the like. ACD server 441 may provide a bank of destination addresses (incoming call lines) for receiving the calls. ACD server 441 may then determine a selected language based on which destination address of which the call was received. In another embodiment, the language selection may be provided by an identifier such as a DTMF keypad entry. The ACD server assigns an agent based on the information received and routes the call to the assigned agent.

CTI server 445 provides computer telephony integration services to automated call distribution application(s) on ACD server 441 and agent operations application(s) on applications server 442. For example, CTI server may translate information about the call to data consumed by agent operations applications. Such data may include call history, geographic information, demographic information, and the like, that can be useful to the assigned agent when servicing the customer's call.

Applications server 442, global workflow server 443, and database server 444 have been described before in example embodiments. Global workflow server 443 may provide workflow operation for the call center and/or clients served by the call center. Database server 444 may store information associated with the call for a number of purposes. In addition to storing statistical, financial, and other data associated with distributed calls for client billing, agent compensation, and scheduling, database server 444 may be utilized for storing data associated with call history, client usage, customer usage, and the like, to be used by a business logic application for the call center or any of the clients.

Quality monitoring server 446 may execute an application for monitoring agent-customer interactions. Calls may be recorded, analyzed, forwarded to other applications by quality monitoring server 446. In another embodiment, quality monitoring server 446 may monitor quality of call distribution service, such as response time, number of steps it takes to assign an agent to a call, and the like, based on collected statistical data. Custom applications server 447 may include any other application associated with the call center operations. Custom applications server 447 may also be utilized to execute client specific applications that provide services specified by particular clients.

The computing devices and networks described herein are only examples of a suitable operating environment and are not intended to suggest any limitation as to the scope of use or functionality of the embodiments. Other well known computing systems, environments, and/or configurations that may be suitable for use with the embodiments may be implemented using the principles described herein without departing from a scope and spirit of the present invention.

Figure 5:
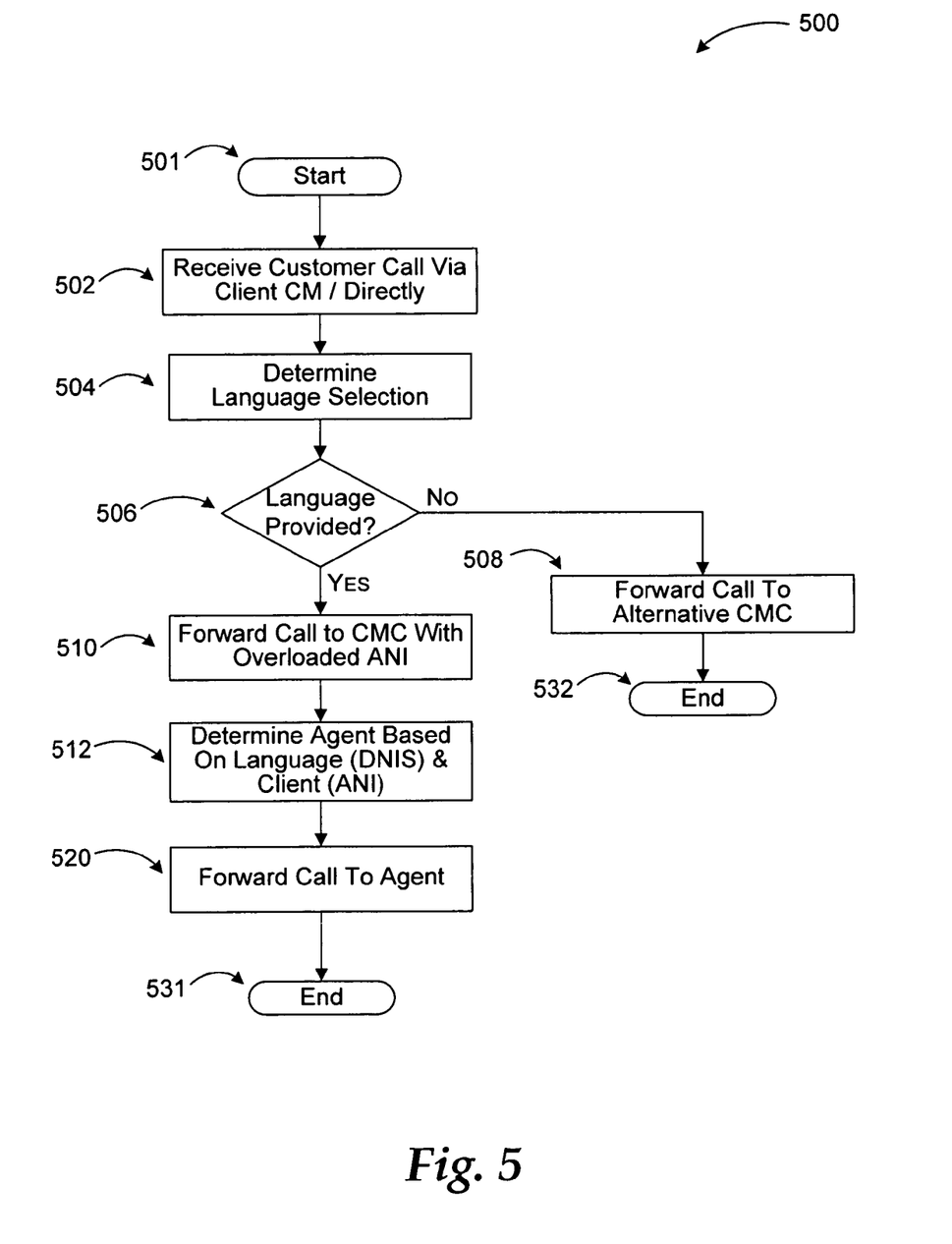
FIG. 5 is a flow diagram illustrating a process for over the phone interpretation call management in accordance with an embodiment.

Referring now to FIG. 5, the OPI call management process 500 embodies actions practiced by a system as described previously. In accordance with an exemplary embodiment, the operation flow of the OPI call management process 500 begins with a start operation 501 and concludes with a terminate operation 531. The start operation 501 is initiated in response to a call being initiated by a customer. The call may be made to a client call management system and forwarded to the OPI call management system or directly to the OPI call management system by the customer. As such, with respect to the exemplary illustration provided herein, the call may involve a phone call, an electronic mail, an instant message, a video conferencing call, and the like. From the start operation 501, the operation flow passes to operation 502.

At operation 502, the customer initiated call is received at the call management center. The receiving component may be an IVR server. Processing advances from operation 502 to operation 504.

At operation 504, the preferred language of the customer is determined. The determination may be made by customer or client selection through DTMF key entry, or similar indication. In one embodiment, the language selection may be determined by detecting the customer's language at the IVR server. The IVR server may go through one or more prompts confirming the language of the customer. In another embodiment, the IVR server may also detect an accent of the customer, as explained previously. The operation flow passes to decision operation 506 from operation 504.

At decision operation 506, a determination is made whether the selected language is provided by the call management center (CMC). If the language is not one of the provided languages, the call may be provided to an alternative CMC within the call center or at another location in operation 508. Once the call is forwarded to the other CMC, that branch of the operation flow ends at terminate operation 532. On the other hand, if the language is among the languages provided by one of the agents associated with the CMC, the flow of operation moves to operation 510.

At operation 510, a call origination identifier, such as an ANI number, may be overloaded with information identifying a client, a client project, a client subdivision, and the like associated with the call. The call is then forwarded with the overloaded call origination identifier to the CMC. One of a plurality of destination addresses (e.g. DNIS number) at the CMC is used based on the language selection. The destination address indicates to the CMC the language selection. The overloaded call origination identifier provides client specific information. Processing advances next to operation 512.

At operation 512, the CMC assigns an agent based on the selected language (e.g. from the DNIS number) and the client specific information (e.g. from the overloaded ANI number). The CMC may consider other factors such as a schedule of available services (language availability), system capacity, network connection quality, and the like. The operation flow passes from operation 512 to operation 520.

At operation 520, the call is forwarded to the assigned agent. Details of this operation are provided in conjunction with FIG. 6 below. Upon completion of the forwarding operation 520, processing ends at terminate operation 531.

Figure 6:
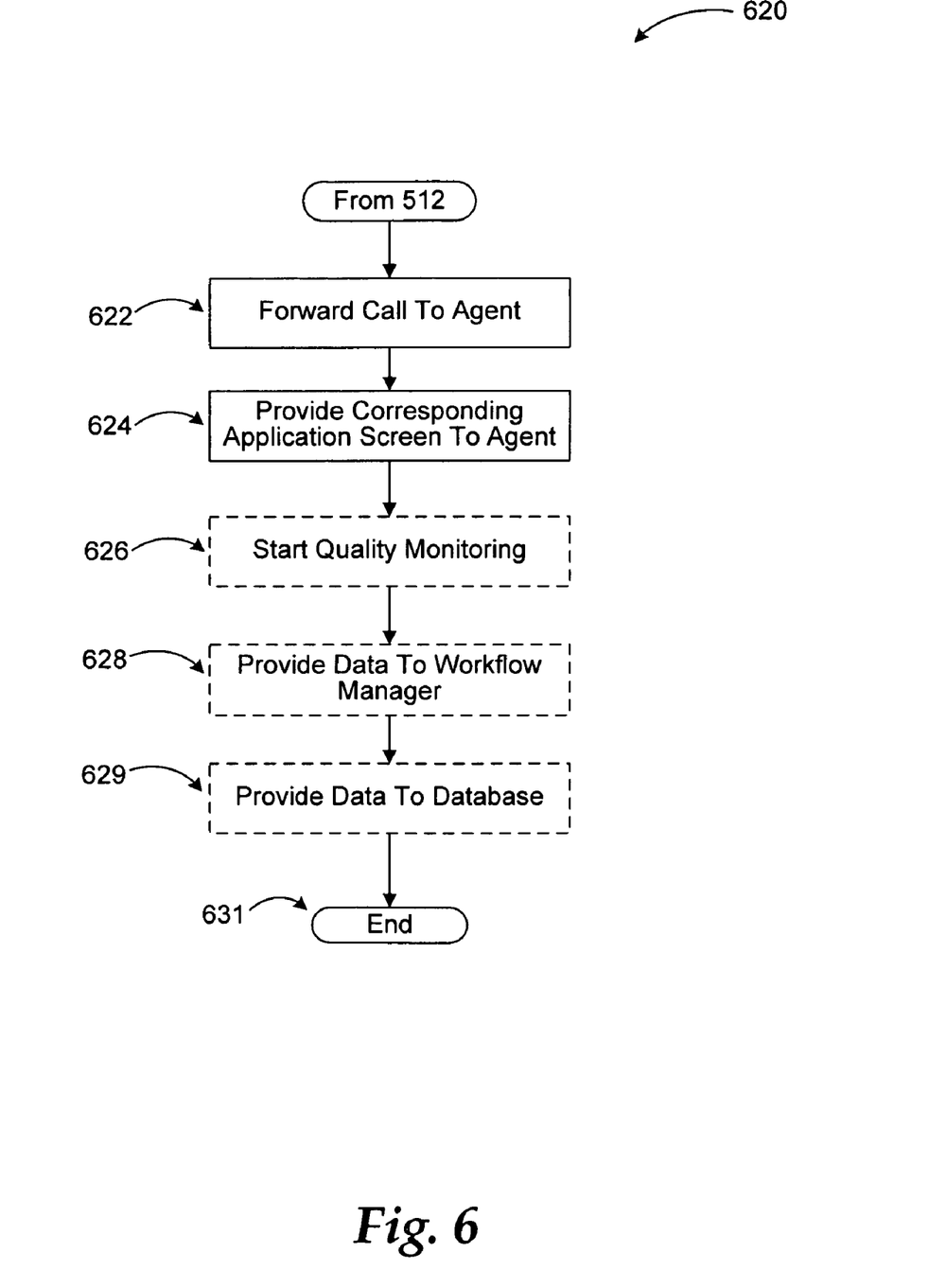
FIG. 6 is a flow diagram illustrating a process for forwarding a call to an agent as part of the process shown in FIG. 5.

FIG. 6 illustrates process 620, which includes details of forwarding operation 520 of FIG. 5 according to example embodiments. Process 620 begins at operation 622 following operation 512 of process 500.

At operation 622 the call is forwarded to the assigned agent's communication line. The assigned agents may include local agents at the call center, remote agents, and the like. The agents may use any one of the previously described communication methods including, but not limited to, PSTN connections, Internet telephony, cellular calls, and the like. The flow of operation passes from operation 622 to operation 624.

At operation 624, the assigned agent is provided with an application screen containing information associated with the customer, the client, the client project, and the like. In addition to providing the information, the CMC may activate one or more user interfaces in an application for the agent that enable the agent to perform tasks associated with the call. For example, at a cable service provider call center, the assigned agent may receive a screen with customer information upon being connected to the customer, and a user interface enabling the agent to modify the customer's cable connection settings may also be activated at the same time. Processing moves from operation 624 to optional operation 626.

At optional operation 626, the CMC may start a quality monitoring application that may record the call between the customer and the agent for quality assurance and training purposes. The operation flow passes from optional operation 626 to optional operation 628.

At optional operation 628, the CMC may provide information associated with the call to a workflow managing application. The workflow managing application may be specific to the call center managing routing of calls to agents, scheduling of agent availability, and the like. In another embodiment, the workflow managing application may perform actions associated with client workflow such as sales scheduling, inventorying of service parts, and the like. The operation flow passes from optional operation 628 to optional operation 629.

At optional operation 629, the CMC may provide data associated with the call to a database server. The database server may collect statistical and other data for financial analysis, reporting, agent compensation, and similar purposes. As described previously, other optional operations including client specified custom applications may also be executed in coordination with the forwarding of the call to the assigned agent. Following optional operation 629, the operation flow ends at terminate operation 631.

The operations included in processes 500 and 620 are for illustration purposes. Over the phone interpretation call management may be implemented by a similar process with fewer or additional steps, as well as in different order of operations.

Although the embodiments have been described in language specific to structural features, methodological acts, and computer readable media containing such acts, it is to be understood that the embodiments defined in the appended claims are not necessarily limited to the specific structure, acts, or media described. One skilled in the art will recognize other embodiments or improvements that are within the scope and spirit of the present invention.

What is claimed is:

1. A computer-implemented method for distributing a customer initiated call to one or more agents associated with a call center, comprising:
    receiving the customer call, wherein the call center is arranged to process the customer call on behalf of a client;
    detecting a language of the caller associated with the received call by an Interactive Voice Recognition (IVR) subsystem;
    determining customer information from a call origination identifier comprising an Automated Number Identification (ANI) number;
    modifying the ANI number such that information associated with the client is overloaded to the ANI number;
    forwarding the call to a call management center, wherein the forwarded call includes the ANI number and a call destination identifier comprising a Dialed Number Identification Service (DNIS) number;
    determining the language of the caller from the DNIS number at the call management center;
    assigning an agent to the received call based on the ANI number and the language of the caller; and
    forwarding the call to the assigned agent.

2. The computer-implemented method as defined in claim 1, further comprising:
    providing the customer information to an application such that the assigned agent receives relevant information associated with the call.

3. The computer-implemented method as defined in claim 1, wherein the customer initiated call includes at least one of: a Public Switched Telephone Network (PSTN) call, an Internet telephony call, a cellular call, an electronic mail, an electronic chat message, an electronic video conference call, an instant message, and a voice message.

4. The computer-implemented method as defined in claim 1, wherein the call origination identifier includes one of: an International Mobile Subscriber Identity (IMSI) number, and an IP address, and the call destination identifier includes an IP address.

5. The computer-implemented method as defined in claim 1, wherein the language selection is detected by a Dual Tone Multi-Frequency (DTMF) key entry.

6. The computer-implemented method as defined in claim 1, further comprising:
    retrieving at least one of a customer history record, a customer demographic record, and a customer geographic record from a database based on the ANI number.

7. The computer-implemented method as defined in claim 1, wherein the information associated with the client includes at least one of: a client identification, a client subdivision identification, and a client project identification.

8. The computer-implemented method as defined in claim 1, wherein the agent is one of: a local agent located at the call center and a remote agent.

9. A system for managing customer initiated calls at a call center based on a customer language, comprising:
    a processing server configured to:
        upon receiving a customer initiated call from one of a customer and a client call management system, determine a language of the caller associated with the call by an Interactive Voice Recognition (IVR) subsystem;
        modify a call origination identifier comprising an Automated Number Identification (ANI) number such that information associated with a client is overloaded to the (ANI) number; and
        forward the call, wherein the forwarded call includes the (ANI) number and a call destination identifier comprising a Dialed Number Identification Service (DNIS) number;
    a call management center configured to:
        receive the call from the processing server;
        determine the language of the caller from the DNIS number;
        assign an agent from a plurality of agents associated with the call management center to the received call based on the language of the caller and the (ANI) number;
        forward the call to the assigned agent; and
        execute an application to provide the assigned agent with a screen that includes information associated with the customer.

10. The system as defined in claim 9, wherein the processing server is further configured to overload the ANI number such that a prefix of the ANI number corresponds to a client identification and the last four digits of the ANI number correspond to a client project.

11. The system as defined in claim 9, wherein call management center is further configured to assign the agent based on an available agents schedule.

12. The system as defined in claim 9, wherein the call management center is further configured to execute at least one of: an application to monitor the call between the customer and the assigned agent for quality assurance and another application to collect statistical information about the call.

13. The system as defined in claim 9, wherein the call management center is further configured to provide data associated with the call to a workflow management application.

14. The system as defined in claim 9, wherein at least one of: the client call management system, the processing server, and the call management center is configured to forward the call to an alternative call management system if the language of the caller is not serviced by any of the plurality of agents associated with the call management center.

15. A non-transitory computer readable storage medium for storing instructions that, when executed by a processor, cause the processor to perform a method of distributing a customer initiated call to one of a plurality of agents associated with a call center, the method comprising the steps of:
    receiving the customer call over a PSTN, wherein the call center is arranged to process the customer call on behalf of a client;
    detecting a language of the caller associated with the call by an Interactive Voice Recognition (IVR) subsystem;
    determining a customer information from an ANI number associated with the call;
    modifying the ANI number such that an information associated with the client is overloaded to the ANI number;
    forwarding the call to a call management center over a Session Initiation Protocol (SIP) network, wherein the forwarded call includes the modified ANI number and a DNIS number;
    determining the language of the caller from the DNIS number at the call management center;
    assigning an agent of the plurality of agents to the received call based on the modified ANI number and the DNIS number; and
    forwarding the call to the assigned agent.

16. The non-transitory computer readable storage medium according to claim 15, further comprising:

upon forwarding the call to the assigned agent, monitoring the call for quality assurance.

17. The non-transitory computer readable storage medium according to claim 15, wherein modifying the ANI number includes overloading the ANI number with at least one of: a client identification, a client subdivision identification, and a project identification.

18. The non-transitory computer readable storage medium according to claim 15, further comprising:

retrieving the customer information that includes at least one of: a customer history record, a customer demographic record, and a customer geographic record from a database based on the ANI number; and activating a user interface in an application such that the assigned agent receives the customer information associated with the call.

19. The non-transitory computer readable storage medium according to claim 15, further comprising:

if the language of the caller cannot be handled by the call management center, forwarding the call to an alternative call management center.

20. The computer-implemented method as defined in claim 1, further comprising:

detecting an accent of the customer by the IVR subsystem.

* * * * *